Feb. 14, 1939.     E. POHL     2,147,350

MOLD

Filed Dec. 8, 1936

Inventor
Ernst Pohl
By Young, Emery & Thompson
Attorneys

Patented Feb. 14, 1939

2,147,350

UNITED STATES PATENT OFFICE 2,147,350

MOLD

Ernst Pohl, Wetzlar, Germany, assignor to Buderus'sche Eisenwerke, Wetzlar, Germany, a corporation of Germany Application December 8, 1936, Serial No. 114,865
In Germany December 10, 1935

1 Claim. (Cl. 22—65)

This invention relates to molds, particularly molds in which hot melts, for example cast iron or steel melts, are to be poured in the manufacture of centrifugally cast articles. The inner surface of such molds tends to crack owing to the high stresses to which it is subjected in operation, and various ways have been tried to counteract this deficiency. For example, it has been proposed to use high grade alloys to make the molds, or to harden their inner surfaces by the nitrating method. It has also been proposed to protect the molds by dusting them with various protective materials before each casting operation. Still another prior proposition is to make the molds of a plurality of tubes drawn one over the other and having different coefficients of heat expansion.

The present invention relates to molds of this last mentioned kind and it consists in providing a mold in which the layers of material of different heat expansion capacity are welded together, the outer layer preferably having the greater heat expansion coefficient. This makes it possible to put the inner layer of the mold not only under compression, but also under tension, according to requirements, and thus to maintain a secure connection of the different layers.

The invention also comprises a method of making such molds according to which an outer layer is first centrifuged into place and an inner layer of material of different heat expansion capacity is centrifuged in direct sequence on said first layer.

In some cases the inner layer of the mold is made of material of greater heat expansion capacity than the outer layer. With increasing heating of the mold the inner layer will be put under compression increasing with the temperature. If desired a mold may be used the inner layer of which has already been given an initial compression. In molds of this latter kind the connection of the layers of different heat expansion capacity may be effected in another manner, for example, by shrinking. Since the heat expansion coefficient of different materials does not vary in linear proportion when the range of temperature is large, but vary in different ways within certain temperature ranges, it is possible to prepare molds, according to the present invention, in which the tension of the inner layer, with rising temperature, does not vary continuously in the one direction, but in different directions, that is first increases and then decreases or vice versa, or following an increase or a decrease, may maintain approximately the same value upon a further variation of the temperature. The magnitude of the tension obtained can be calculated from the changes in form which the separate layers would undergo if they were free from each other and from the extent to which they are prevented from making this change of form by their connection with each other.

The invention is applicable in the case of chilled, unheated and heated molds.

The drawing illustrates a mold for making centrifugally cast articles, such as cast pipe in which.

Figure 1:
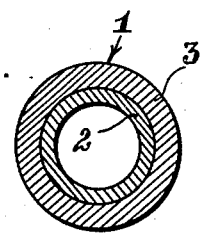
Figure 1 is a cross-sectional view taken on line I—I of Fig. 2.
Figure 2:
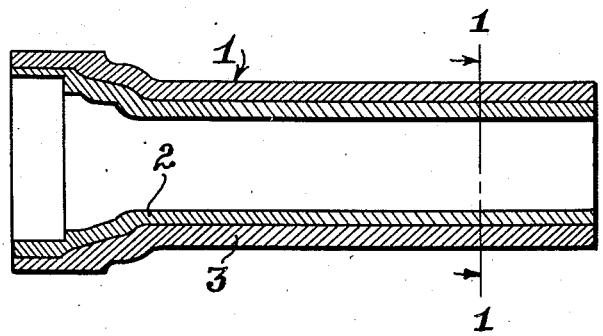
Fig. 2 is a longitudinally sectional view of the mold.

The mold I is composed of an inner layer 2 and an outer layer 3. These layers are made of metal of different heat expansion capacity and although the layers are welded together the layers are shown as having different cross hatching to illustrate the layers of metal of which the layer 2 is under tension at room temperature but which changes to compression at higher temperatures.

I claim as my invention:

A mold for making centrifugally cast articles, comprising inner and outer layers of metal of different heat expansion capacity, the inner layer being centrifugally welded to the outer layer and having a greater heat expansion capacity than said outer layer, whereby the inner layer is under tension at room temperature which changes to compression at higher temperatures.

ERNST POHL.